United States Patent
Cocks et al.

(10) Patent No.: US 6,745,250 B1
(45) Date of Patent: Jun. 1, 2004

(54) FINDING NAMED EJB HOMES VIA LIFE CYCLE SUPPORT

(75) Inventors: Stephen James Cocks, Bournemouth (GB); Wei-Li Alexander Huang, Austin, TX (US); James Irwin Knutson, Austin, TX (US); Russell Ley Newcombe, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 09/605,781

(22) Filed: Jun. 28, 2000

(51) Int. Cl.$^7$ ................................. G06F 9/00
(52) U.S. Cl. ........................ 709/316; 707/10
(58) Field of Search ................ 709/310, 315, 709/316, 245, 330, 332; 707/103, 10; 717/6

(56) References Cited

U.S. PATENT DOCUMENTS

| | | | |
|---|---|---|---|
| 5,948,072 A | * 9/1999 | Cink et al. ................ | 709/330 |
| 6,016,514 A | * 1/2000 | Cink et al. ................ | 709/315 |
| 6,167,453 A | * 12/2000 | Becker et al. ............. | 709/245 |
| 6,260,078 B1 | * 7/2001 | Fowlow ..................... | 709/332 |
| 6,269,373 B1 | * 7/2001 | Apte et al. ................. | 707/10 |
| 6,298,478 B1 | * 10/2001 | Nally et al. ................ | 717/6 |
| 6,418,447 B1 | * 7/2002 | Frey et al. ................. | 707/103 |

OTHER PUBLICATIONS

Blank et al. "Aspects of Enterprise Java Beans" Information Builders, Inc. May 1998, pp. 1–4.*
Waldo "The Jini Architecture For network–Centric Computing" vol. 42, No. 7, Communications of ACM, Jul. 1999, pp. 76–82.*
Krishman "Enterprise JavaBeans to CORBA Mapping" Sun Microsystems, Version 1.1, Aug. 1999, pp. 1–21.*

* cited by examiner

Primary Examiner—John Follansbee
Assistant Examiner—V. H. Nguyen
(74) Attorney, Agent, or Firm—David A. Mims, Jr.; Robert V. Wilder

(57) ABSTRACT

A method and implementing system are provided in which CORBA (Common Object Request Broker Architecture) Life Cycle Service FactoryFinder capabilities are combined with CORBA Naming Service resolve operations on a Naming Context. The methodology allows EJBHomes in a distributed network to be found using CORBA Life Cycle Services while maintaining support for the EJB (Enterprise Java Bean) programming model of using JNDI (Java Naming and Directory Interface) lookup calls to locate EJB-Homes. Usage of Life Cycle Services in an EJB environment for finding EJBHomes by using Naming interfaces is enabled while using Life Cycle Service semantics. An exemplary embodiment is provided to allow deployment in different environments (including environments without Life Cycle support) and reconfiguration of the FactoryFinder being used, without requiring changes to source code.

16 Claims, 7 Drawing Sheets

FINDING NAMED EJB HOMES VIA LIFE CYCLE SUPPORT

FIELD OF THE INVENTION

The present invention relates generally to information processing systems and more particularly to a methodology and implementation for finding references to objects in a distributed object-oriented network environment.

BACKGROUND OF THE INVENTION

The development of application and system software for information processing systems has traditionally been a time-consuming and somewhat repetitive task, with software developers often having to write and re-write code to perform well known user interface and system functions in addition to writing the code optimized to implement the desired new functionality. Object-oriented programming (OOP) has emerged as a dominant programming paradigm that enables the rapid development and implementation of functionality while permitting the customization and re-use of software "objects".

The power of OOP as a software development philosophy is realized chiefly through object frameworks which provide a collection of base object classes that can be selectively utilized by a system developer to create a software system, much like a hardware developer might construct a desktop computer from standard hardware components. Object frameworks are particularly advantageous when utilized within a distributed computing environment in which multiple, and possibly heterogeneous or dissimilar computer systems are interconnected to allow system hardware and software resources to be shared between computer systems. In order to permit programs written in multiple diverse languages to utilize object classes defined within a single object framework, it is necessary to develop a minimum level of object standardization to enable the inter-operability of object-oriented software. One organization that is working to establish industry guidelines and object management specifications to provide a common object framework for application development is the Object Management Group (OMG).

The specifications promulgated by the OMG enable the reusability, portability and interoperability of object-based software in heterogeneous distributed computing environments. An example of a commercially available object framework that conforms to OMG specifications is contained in the WebSphere Enterprise Edition Component Broker, Version 3.0, available from International Business Machines Corporation.

The OMG is an international consortium of organizations involved in various aspects of client/server computing on heterogeneous platforms such as shown in FIG. 1. The OMG has set forth published standards by which clients communicate in OOP form with servers. As part of these standards, an Object Request Broker has been defined as part of the Common Object Request Broker Architecture (CORBA). CORBA defines the object-oriented bridge between the client and the server. The object request broker (ORB) de-couples the client and server applications from the object-oriented implementation details.

The OMG defines an industry standard for "Object Services" in a document referred to as "CORBAservices: Common Object Services Specification", which is included herein by reference. The OMG Object Services Specification includes a series of chapters specifying a variety of services for use in CORBA systems. Such service specifications include, inter alia, a "Naming Service" Specification 97-12-10, and "Life Cycle Service" Specification 97-12-13.

In a distributed object-oriented environment, there is a need to be able to locate references to objects. The OMG Naming Service provides such a mechanism, by allowing an object to be located by the use of a human-readable name. A naming service provides a one-to-one mapping from a human-readable name to an object instance.

Another mechanism provided to locate object references in a distributed object-oriented environment is by use of the FactoryFinder interface defined in the OMG Life Cycle Service. A FactoryFinder provides a standard service that can be utilized by applications to locate a Factory object, i.e. an object that is used to create instances of other objects, within the heterogeneous distributed object-oriented computing environment. The Life Cycle Service provides a mechanism for finding factories anywhere in a distributed environment, where the factories are identified by the interface supported by the objects which the factories create rather than by a simple name.

In an environment where both Naming and Life Cycle FactoryFinder services are provided (such as the OMG CORBA programming model), both services are often used together to enable a client or user to locate object factories. The client uses the Naming Service to locate a Life Cycle Service FactoryFinder object, and then uses the FactoryFinder object to locate an object factory.

Another major force within the distributed object-oriented industry are the Java specifications from Sun Microsystems. Among the specifications provided is "The Enterprise JavaBeans Specification, Version 1.0" which provides a server-side architecture for the deployment of objects in a distributed object-oriented environment. Also, there is a "Java Naming and Directory Interface, Application Programming Interface (JNDI API)" specification that provides interfaces which allow Java objects to make use of various Naming and Directory implementations. Thirdly, there is the "Enterprise Java Beans to CORBA Mapping, Version 1.0" Specification. These specifications define how JNDI can be used to find factories for Enterprise JavaBeans. The WebSphere Enterprise Edition Component Broker Version 3.0 from IBM (mentioned earlier as providing an available implementation of CORBA) is also an example of a commercially available implementation of these Java specifications.

To further elaborate, the EJB specification defines an interface called a "Home" that serves as a factory for EJB objects. The specification defines how to use JNDI to find references to Homes in the distributed object-oriented environment. A common approach to implementation of naming services in an EJB environment is to have the JNDI interface layered over the OMG Naming Service. An implementation of JNDI done in this way is referred to as a CosNaming plug-in. The "Enterprise Java Beans to CORBA Mapping, Version 1.0" specification gives specific guidance for the layout of an OMG name space for the bindings to EJB-Homes when used by a CosNaming plug-in.

The Java specifications do not provide for a service similar to the Life Cycle Service defined by the OMG. However, in a distributed object-oriented environment, there are advantages to using Life Cycle Services rather than Naming Services to locate object factories. Because FactoryFinder objects find object factories based on specified selection criteria (i.e. type of objects the factory creates) rather than by specific name, FactoryFinders provide a level of indirection between the client and the dynamically changing distributed environment in which the object factories exist. Thus, instead of finding a specifically named object as is done in a naming service, a FactoryFinder finds object factories that meet the specified input criteria. This level of indirection enables more complex distribution scenarios while protecting the client code from having to change whenever the environment is reconfigured and additional named objects are installed.

In co-pending applications, Ser. No. 09/605,779 and Ser. No. 09/605,780, which are both included herein by reference, there is disclosed, inter alia, a mechanism which allows code that needs to find EJBHomes to have the advantages of a Life Cycle Service FactoryFinder, including being protected from change when the configuration changes. However, using that methodology, the FactoryFinder parameters are used rather than fully qualified EJBHome names. Thus, the use of the FactoryFinder methodology is exposed to the user since, even though Naming interfaces are used, the syntax of the parameters passed must conform to the rules for FactoryFinders.

Further, even though the FactoryFinder methodology protects source code used to find EJBHomes from needing to be changed when changes in the configuration occur in a specific environment where those enterprise beans are deployed, it is noted that enterprise beans are intended to be deployed in more than one environment. For example, during the development and testing of an EJB-based application, the enterprise beans may be deployed first in a unit-testing environment, then in an integration-testing environment, followed by a system-testing environment and finally into a production system. In addition, that same EJB-based application may be deployed into different production systems which may have different characteristics. Some of the test environments or alternate production environments may not even provide factory finding capabilities. Therefore it is highly likely that, using the above methodology, the name will have to be changed as the code is progressed from development, through testing and into production, or when migrated from one production environment to another. In some cases, where factory finding is available in both environments, the path from the root of the name space to where the FactoryFinder is bound would need to be changed. In addition, when one of those environments does not provide factory finding capability, a fully qualified name for the EJBHome from the root of the name space would need to be used. In an EJB-based application, there may be many places where enterprise beans need to find the EJBHomes of other enterprise beans. The need for source code changes in many enterprise beans at each of these stages introduces a process that is not only time consuming and tedious, but is also inherently error-prone.

Thus, there is a need for an improved methodology and implementing system where Naming interfaces can be used for finding EJBHomes using Life Cycle semantics without exposing Life Cycle to the user, and while satisfying the intent of the previously mentioned EJB specifications. There is a further need to provide such a methodology and implementing system which allows the deployment of the enterprise beans in different environments and during different stages of the development cycle without requiring source code changes to be made.

SUMMARY OF THE INVENTION

A method and implementing system are provided to enable EJBHomes to be found using Naming interfaces and fully qualified EJBHome names while making use of Life Cycle factory finding semantics. Means are provided to allow the enterprise beans to be deployed in different environments without source code changes, including environments which would require the reconfiguration of the FactoryFinder being used and environments that don't provide factory finding capabilities.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
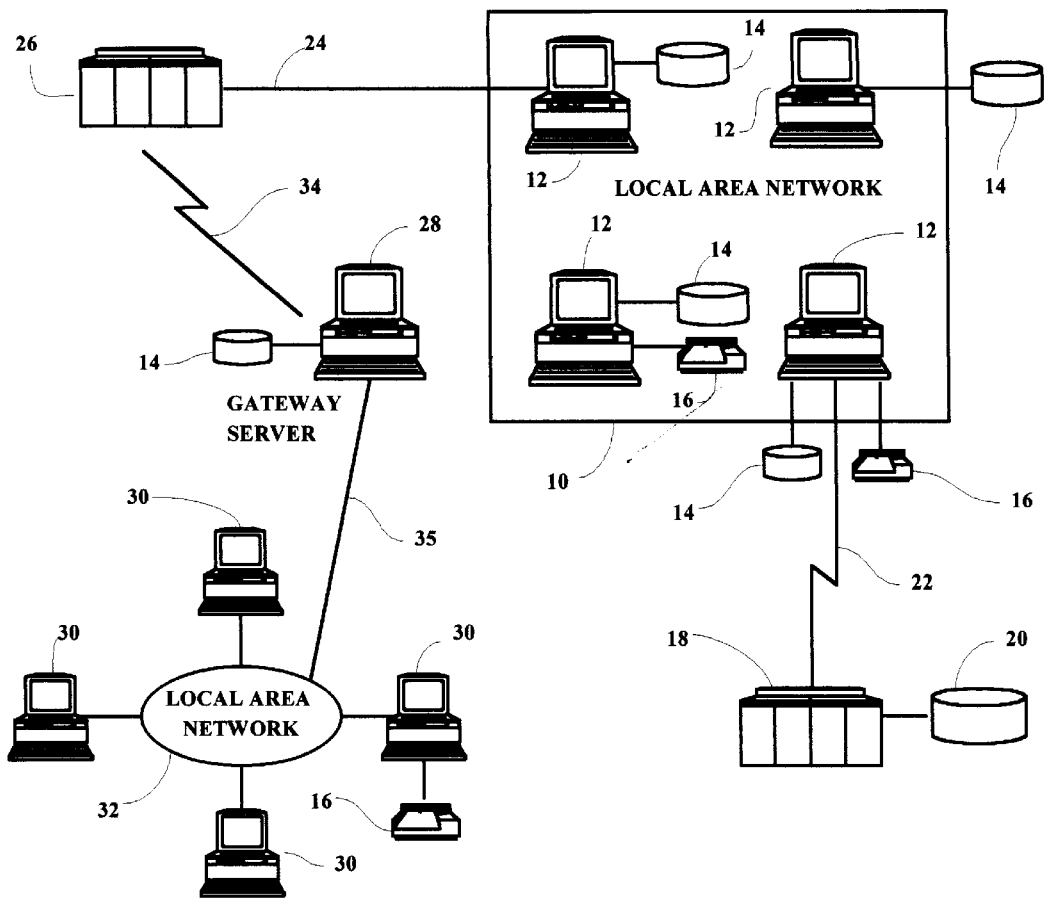
FIG. 1 is an illustrative embodiment of a heterogeneous distributed information processing system in accordance with the present invention.

The various methods discussed herein may be implemented within an exemplary distributed information processing system as illustrated in FIG. 1. As shown, an information processing system contains a plurality of networks including Local Area Networks (LAN) 10 and 32, each of which preferably includes a plurality of individual computers 12 and 30, respectively. One skilled in the art will appreciate that a plurality of workstations coupled to a host processor may be utilized for each such LAN. As is common in such processing systems, each computer 12 and 30, may be coupled to a storage device 14 and a printer 16.

The exemplary processing system further includes one or more mainframe computers, such as mainframe computer 18, which may be preferably coupled to LAN 10 by means of a communications link 22. Mainframe computer 18 is preferably coupled to a storage device 20, which serves as remote storage for LAN 10. LAN 10 is also coupled via communications link 24 through communications controller 26 and communications link 34 to gateway server 28. Gateway server 28 is preferably a workstation which serves to link LAN 32 to LAN 10 via communications link 35. As understood by one skilled in the art, the illustrated processing system further includes un-illustrated additional gateways, routers, bridges and various other network hardware utilized to interconnect the various segments of the exemplary processing system.

Figure 2:
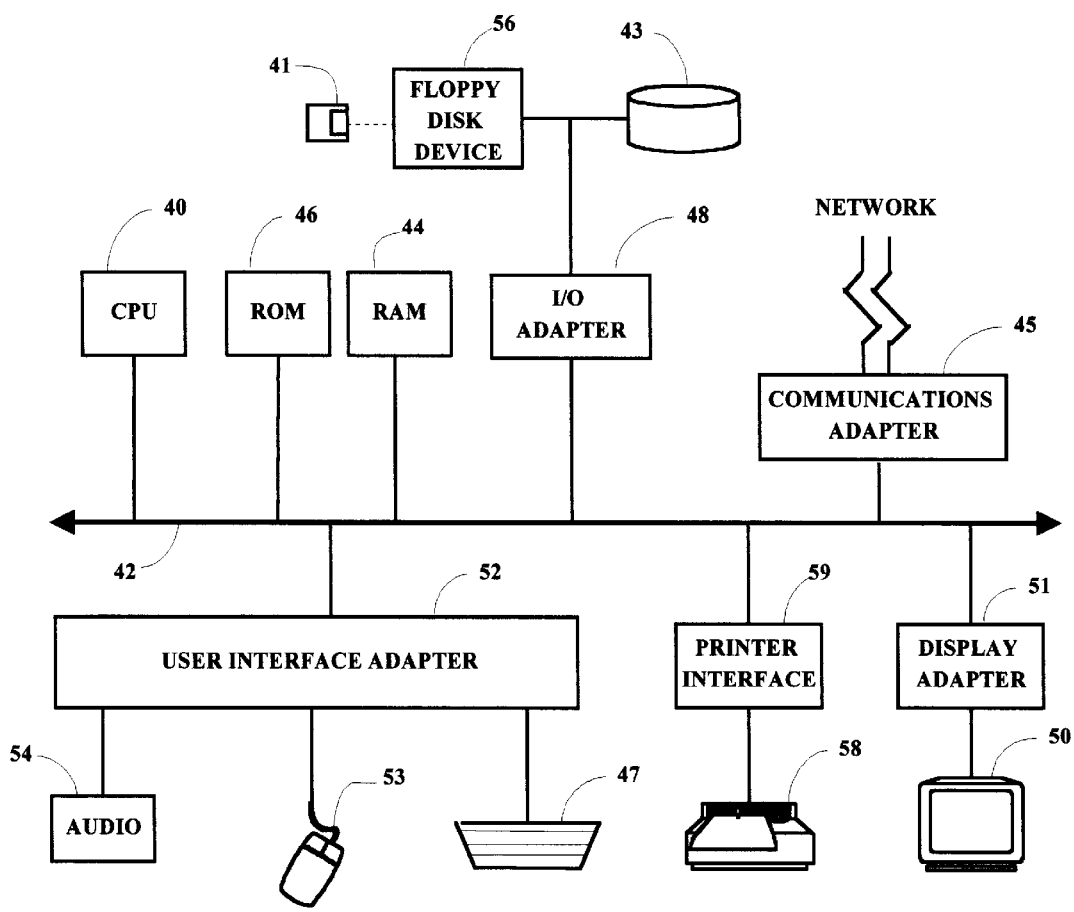
FIG. 2 is a schematic block diagram of a computer/workstation within the distributed information processing system shown in FIG. 1.

Referring to FIG. 2, there is shown a pictorial representation of a workstation having a central processing unit (CPU) 40 such as a conventional microprocessor, and a number of other units interconnected via a system bus 42. The exemplary workstation shown in FIG. 2 further includes a Random Access Memory (RAM) 44, a Read-Only Memory (ROM) 46, an input/output (I/O) adapter 48 for connecting peripheral devices such as storage unit 43 and floppy disk device 56 to the bus 42. A user interface adapter 52 is shown connecting a keyboard 47, a mouse 53 and an audio system 54 (which may include speakers and microphones) to the bus 42. Other devices such as a touch-screen input device (not shown) may also be connected to the bus 42 through the user interface adapter 52. A communications adapter 45 is shown in the example connecting the bus 42 to one or more networks, and a display adapter 51 connects a display device 50 to the main bus 42. The computer software embodiment of the present invention may be included as a software toolkit installed on one of the workstations within the distributed environment illustrated. One skilled in the art will appreciate that the procedures associated with the present invention may be in the form of a computer program product on a computer readable medium, which may be temporarily or permanently loaded on the illustrated workstation in disk storage 43, floppy disk 41 or RAM 44.

Figure 3:
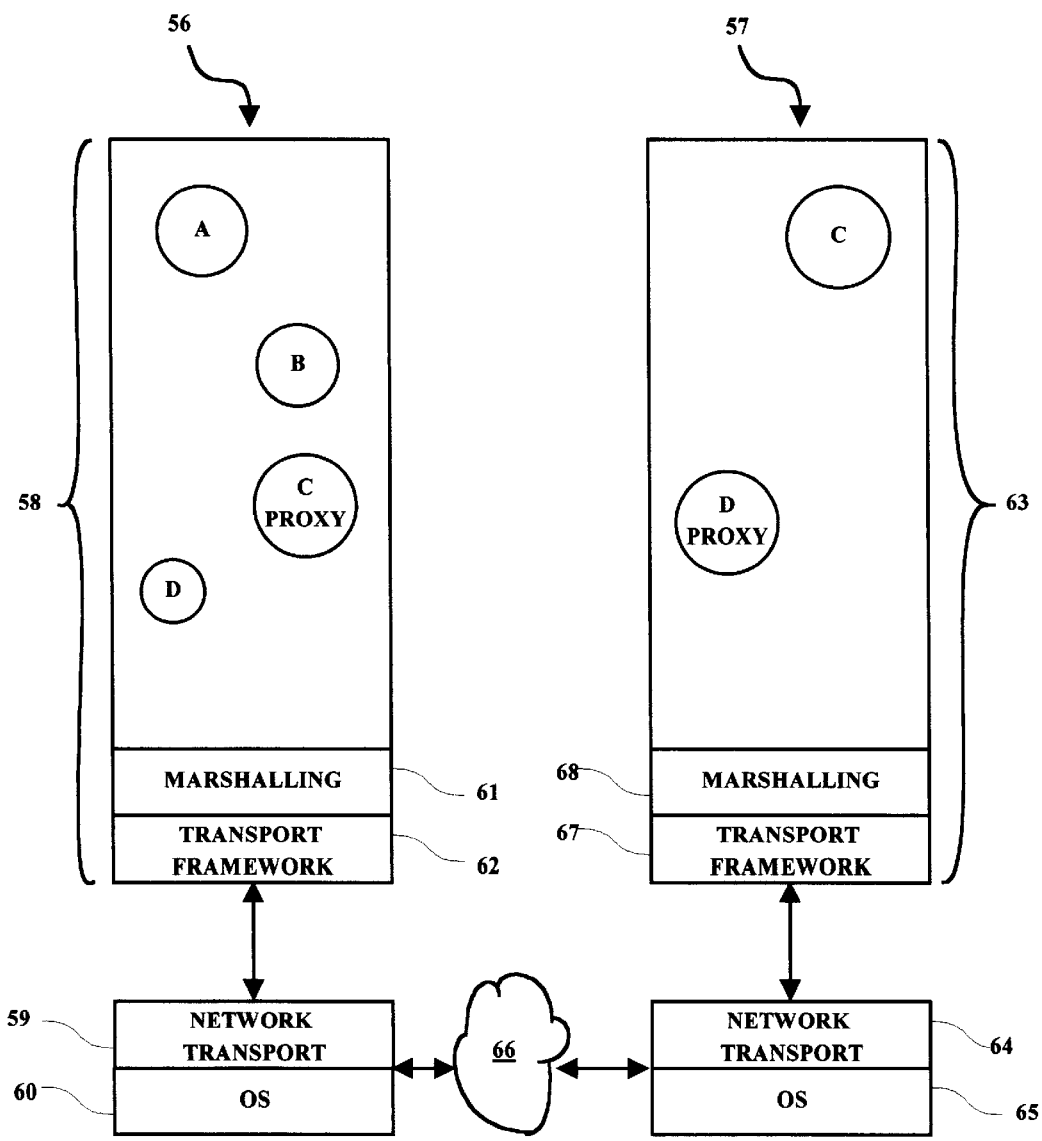
FIG. 3 is a pictorial representation of an exemplary generalized software configuration of two nodes within a heterogeneous distributed object-oriented computing environment.

In FIG. 3, there is illustrated a generalized software configuration of two nodes 56 and 57 within a heterogeneous distributed computing environment such as an information processing system. As illustrated, nodes 56 and 57, which can comprise two of computers 12 within information processing system, execute software under the control of possibly diverse operating systems 60 and 65, respectively. Although diverse operating systems may be utilized by nodes 56 and 57, intercommunication between nodes 56 and 57 via network 66 is facilitated by network transport layers 59 and 64, which can comprise Transport Control Protocol/Interface Program (TCP/IP), for example. The software configuration of nodes 56 and 57 further comprise a distributed object environment 58 and 63, including software objects A, B, C and D. To illustrate the interaction of objects A–D within distributed object environment 58 and 63, assume that object A invokes a method on objects B and C, passing object D as a parameter, and that objects B and C belong to the same class. If object A calls object B, a local object, all of the interaction between objects A, B and D occurs within the same local process and is controlled strictly by the dispatching and reference mechanisms of the local process. On the other hand, if object A calls object C, with C being a remote object, the call is directed to object C proxy, which interacts with marshalling code 61 and transport framework 62 to package the call parameters into a message having a format suitable for transmission over network 66. In response to receipt of the message at node 57, network transport 64 passes the message to transport framework 67 and marshalling code 68, which de-marshals the parameters to re-construct the call of object C. Thereafter, an object D proxy is created and object C is called in the same manner as if object C were local to object A. Any requests from object C to object D are similarly handled through object D proxy. As can be seen from the above description of a distributed object environment, an object can transparently interact with other objects within the distributed object environment without regard to whether the other objects reside at a local or remote node or whether the objects are within the same process.

Figure 4:
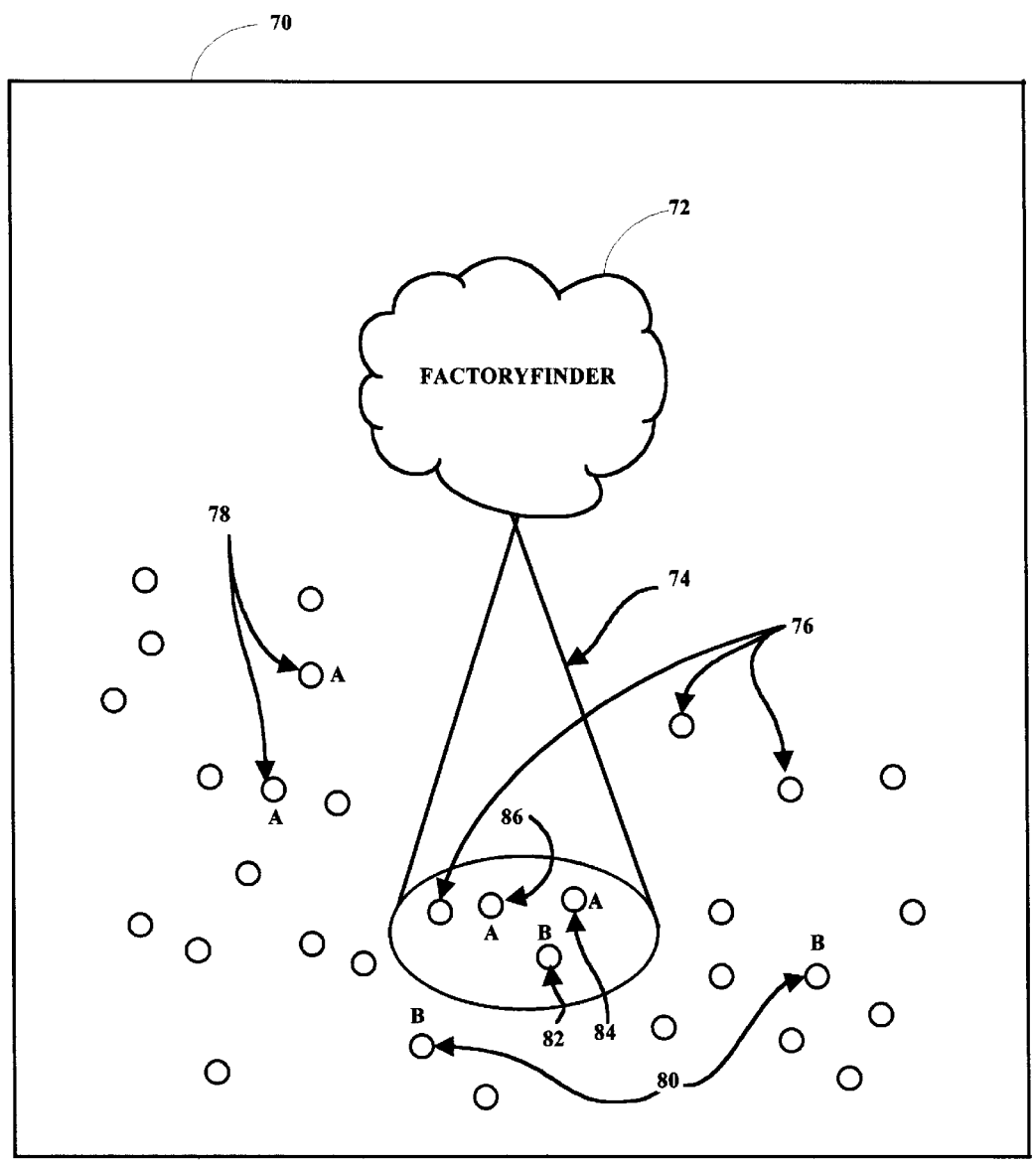
FIG. 4 is an illustration showing a FactoryFinder function within a distributed domain.

In FIG. 4, there is illustrated the Life Cycle Service FactoryFinder as defined by the OMG and as implemented in the environment for the preferred embodiment. As illustrated, there is shown a representation of a FactoryFinder's scope as defined by the OMG Life Cycle Service. A distributed domain 70 contains factory objects 76 which are used for creating objects within the domain. These factory objects create objects of different types, such as type A objects 78, 84, 86 and type B objects 80, 82. The distributed domain 70 also contains a FactoryFinder object 72 which is capable of finding factories within a particular scope 74 of the distributed domain 70. CORBA FactoryFinders are configured so as to only consider a portion of the entire distributed environment when looking for a factory. Thus, the FactoryFinder defines "where" to look. When a FactoryFinder 72 processes a client request, it is the client that tells the FactoryFinder 72 what to look for within its scope 74. For example, if FactoryFinder 72 was asked to find a factory of A objects 78, 84, and 86, the FactoryFinder 72 would return one of the factories for A objects 84, 86 within its scope 74 but would not return the factory for A object 78 which is outside of the scope 74 of the FactoryFinder 72. Thus, a FactoryFinder 72 encapsulates "where" to look in the distributed domain 70 and the client's request defines "what" the FactoryFinder 72 should look for.

In some environments, FactoryFinder objects have been enhanced to allow them to be used to find references to objects in the distributed domain where normal Life Cycle FactoryFinder parameter values are not used. For example, in the above referenced co-pending applications, a method and implementing system for finding named collections using Life Cycle FactoryFinder objects is described. A request to a FactoryFinder uses a simple name to identify the collection that is desired. The method enables that simple name to be transformed into appropriate parameter values used to perform a FactoryFinder operation for locating the collection in the distributed object-oriented environment. For example, a normal FactoryFinder operation accepts a parameter such as:

Policy.object interface when the requestor wants a factory that can create Policy objects, or Policy.object interface/PolicyPersistentRDBImpl.object implementation when the requestor wants a factory that can create Policy objects that use a relational database for their persistent backing store. With the method disclosed in the co-pending applications, the FactoryFinder can accept a parameter such as:

AutoPolicyHome.collection when the requestor (such as a Query Service) is looking for the Home of AutoPolicy objects. According to the methodology, the FactoryFinder transforms the request to be a parameter such as:

AutoPolicy.object interface/AutoPolicyFactory.object home which is suitable for normal FactoryFinder processing.

The present invention provides the basis for an approach to finding EJBHomes using Life Cycle FactoryFinder semantics without exposing any aspect of the Life Cycle Service to the application. Further, it isolates source code from needing to change when enterprise beans are in different environments due to development cycle considerations or deployment in different production environments. The major aspects of this approach include: (1) A NamingContext which contains a FactoryFinder which supports requests with simple names; (2) The NamingContext can transform compound names to simple names relative to where it is in the name space; (3) The NamingContext can be used as an application specific InitialContext; and (4) A set of tooling that can generate all the required elements needed by an application. In the following paragraphs, each of these aspects is discussed in greater detail.

In the co-pending applications, there is described a FactoryFinder which supports NamingContext interfaces. In that case, the only mechanism for processing those requests was by doing FactoryFinder processing. However, in this invention, this NamingContext is a normal NamingContext that is capable of processing resolve operations to lookup objects in the name space. However, the NamingContext does contain a reference to a FactoryFinder to which the NamingContext can delegate resolve requests when needed. In the case where a resolve results in a "NOT FOUND" exception when looking in the normal name space, the NamingContext calls the FactoryFinder, passing the name as described in the referenced applications.

The NamingContext can transform compound names to simple names relative to where it is in the name space. The FactoryFinder is only capable of handling simple names. However, the NamingContext may be called with compound names, such as:

com/ibm/EJBApp1/myEJB

This compound name must be transformed into a simple name before being passed to the FactoryFinder, in a form such as:

com::ibm::EJBApp1::myEJB

In addition, the NamingContext must also know where it is in the name space, so the appropriate simple name can be generated. For example, using the same name as above, suppose the NamingContext were called with the name:

com/ibm/EJBApp1

The NamingContext would return a NamingContext that could then receive the request for name:

myEJB

The FactoryFinder only knows this EJBHome by the name:

com::ibm::EJBApp1::myEJB

Therefore, the NamingContext must be able to build this simple name from its relative location in the name space combined with the name it is asked to resolve.

The NamingContext can be used as an application-specific InitialContext. Source code in the application that is used to lookup EJBHomes should not have to be concerned about where in the name space this special NamingContext is bound (i.e. path from the name space root context to this special NamingContext). The JNDI interface used by the source code provides a mechanism, called an InitialContextFactory, which is capable of positioning the application at an appropriate NamingContext in the name space. Making use of this, the invention introduces the idea of an Application Context, one of these special Naming-Contexts which the application can use as its own root context.

In a preferred embodiment of the invention, there are several default Application Contexts provided, each one configured with a FactoryFinder that searches a different scope of the distributed object-oriented environment. There is also an InitialContextFactory provided for each of these default Application Contexts. For many applications, these default Application Contexts will be sufficient for the needs of the application. In addition, when the defaults are not appropriate, applications can use their own customized Application Context that is configured with a FactoryFinder appropriate to that specific application.

The disclosed methodology also provides a set of tooling that can generate all the required elements needed bean by an application. No unique tooling is needed when the default Application Contexts are used. Tooling is provided for creation of customized Application Contexts and any required subcontexts. When a customized Application Context is created, there is also tooling that generates the InitialContextFactory that is needed by the application.

Figure 5:
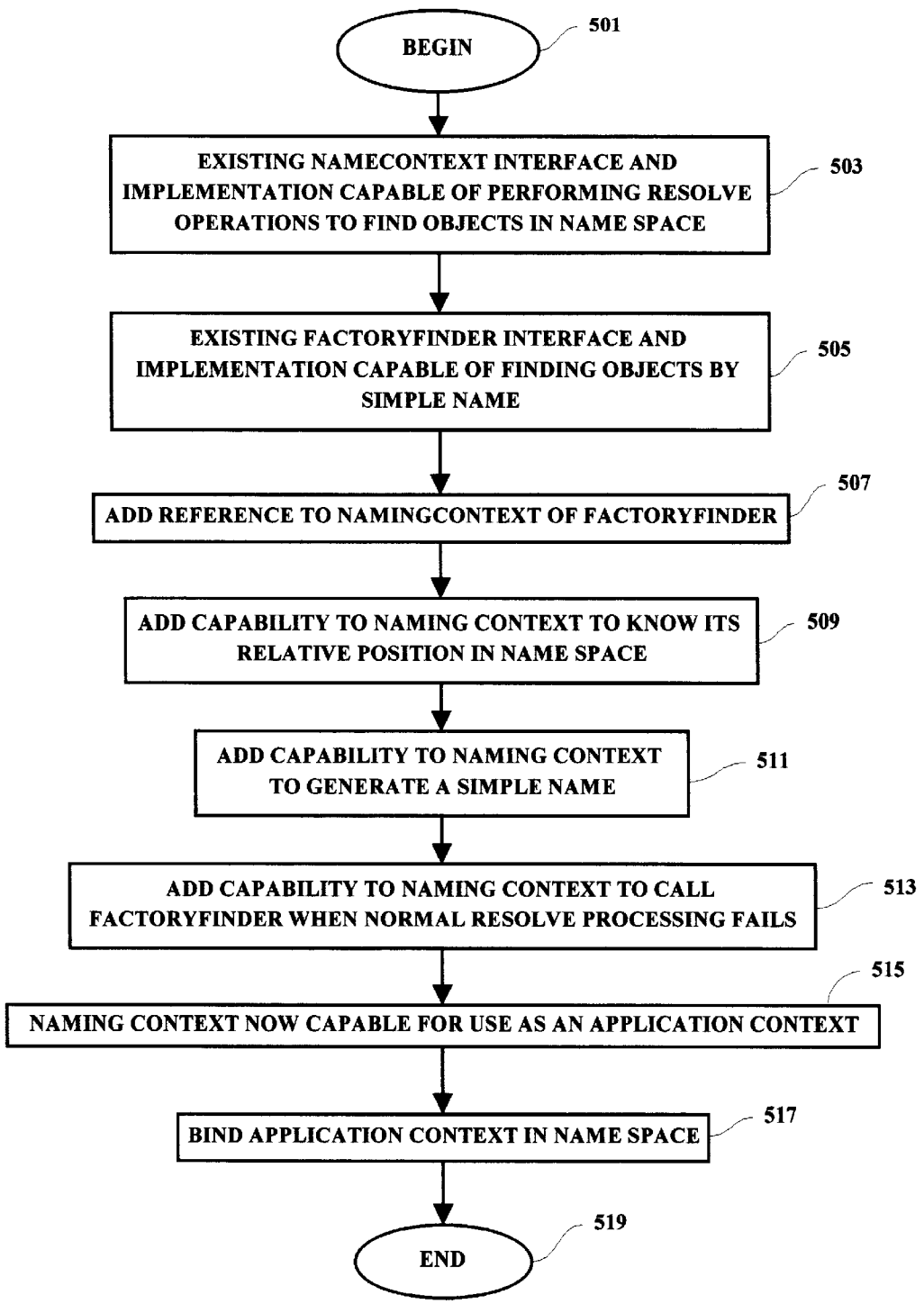
FIG. 5 is a flow chart illustrating an exemplary processing methodology to enable a NamingContext to be used as an Application Context.

Referring now to the flow chart in FIG. 5, the methodology to enable a NamingContext to be used as an Application Context is shown. Beginning at 501, an existing NamingContext interface and implementation 503 is established. This NamingContext is capable of processing resolve requests and using the name passed in to lookup the requested object in the name space. Next, an existing FactoryFinder interface and implementation 505 is established. The FactoryFinder of step 505 is capable of accepting input parameters containing a simple name and performing the appropriate Life Cycle FactoryFinder processing needed to find the object in the distributed object-oriented environment. The NamingContext implementation 503 is enhanced 507 to add a reference to a FactoryFinder, such as the one on 505. The NamingContext implementation 503 is also enhanced 509 to be able to know its relative position in the name space. An additional enhancement 511 is also added to the NamingContext 503 so that it can generate a simple name suitable for use by the FactoryFinder 505. This simple name is a transformation of a compound name which is a combination of the name derived from the relative position in the name space and the name passed in on the resolve operation. The NamingContext implementation 503 is further enhanced to call the FactoryFinder 505 using the generated simple name when normal NamingContext resolve processing would result in a NOT FOUND exception being thrown. Having made all the enhancements to the NamingContext implementation 503, the resulting Naming-Context is suitable for use as an Application Context 515. The Application Context can be bound into the name space 517. After this is accomplished, the methodology is completed 519, and the resultant Application Context can be used for finding EJBHomes.

Figure 6:
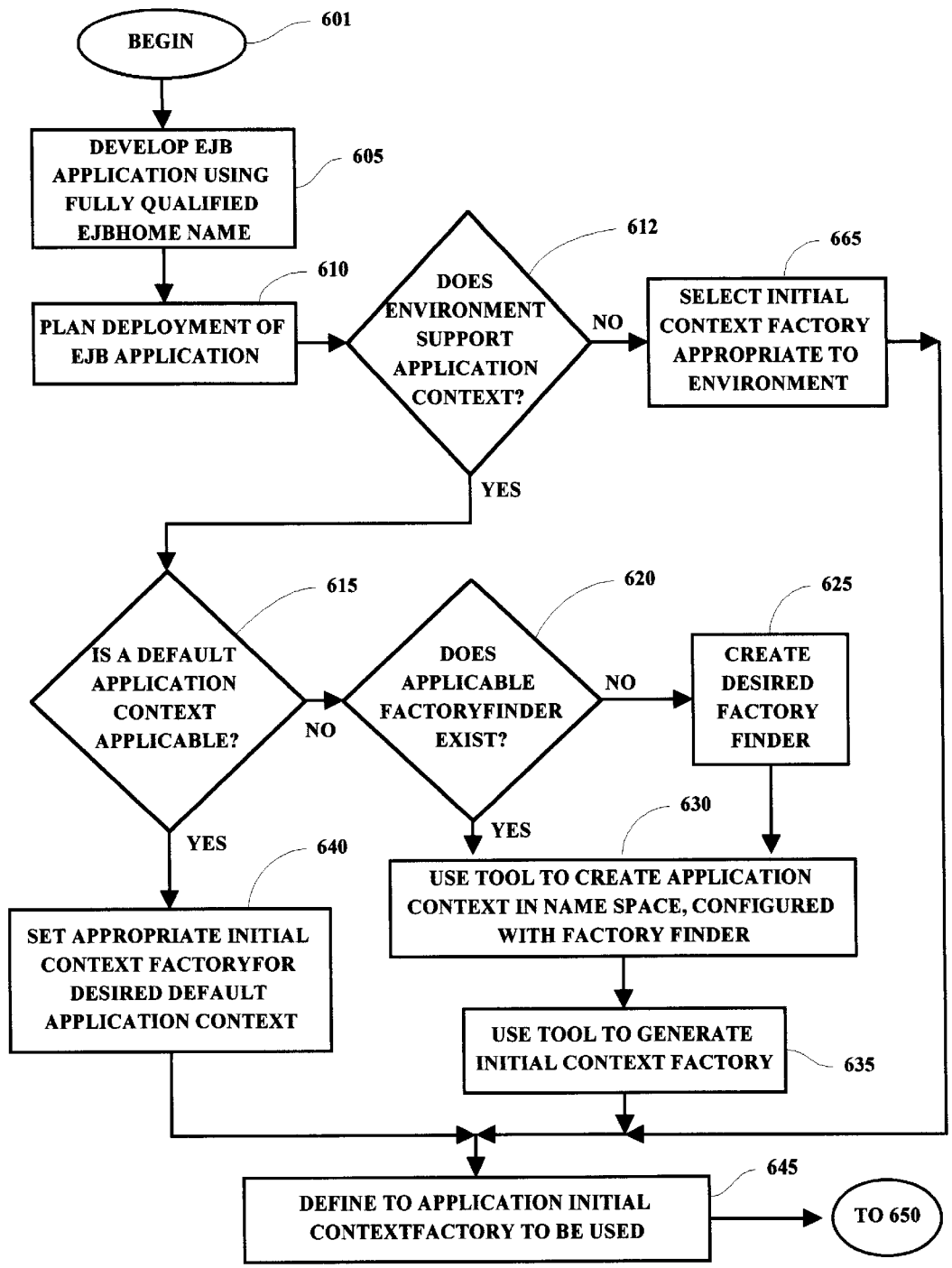
FIG. 6 is a flow chart illustrating an exemplary processing methodology used for an EJB-based application to make use of an Application Context.
Figure 7:
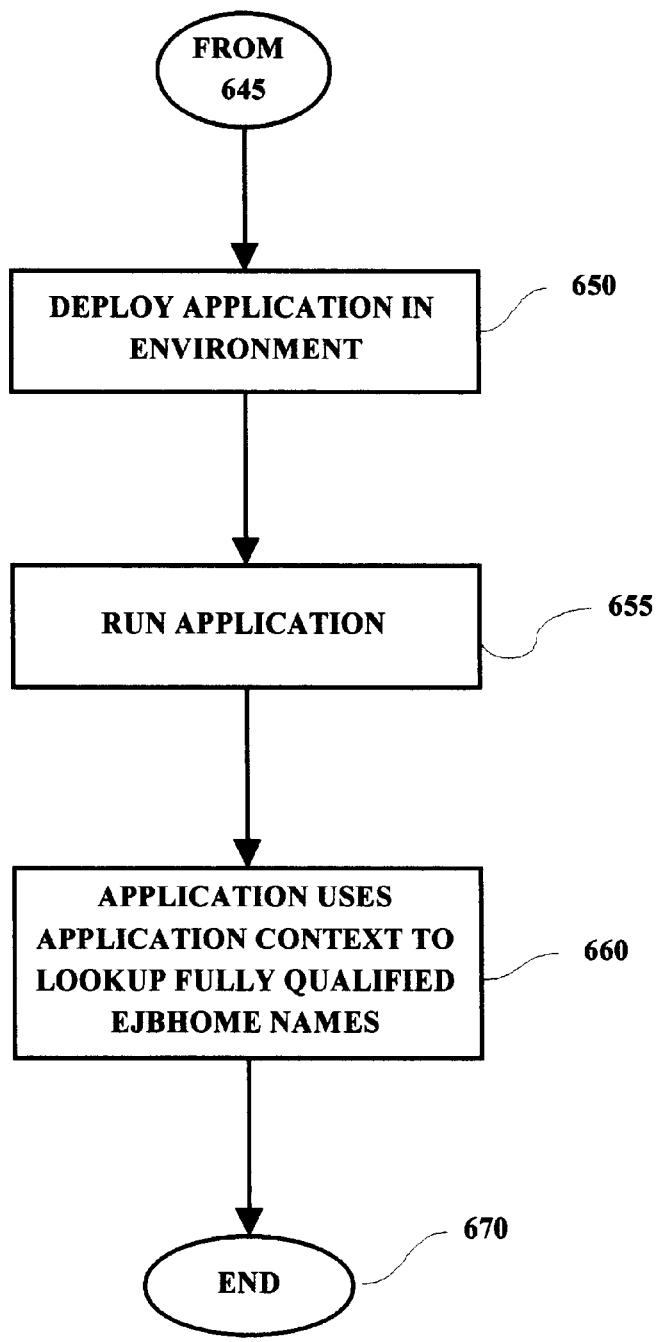
FIG. 7 is a continuation of FIG. 6.

The flow chart in FIG. 6 presents the methodology used for an EJB-based application to make use of an Application Context. Beginning at 601, an EJB application is developed 605 where the source code contains fully qualified EJB-Home names used in JNDI lookup calls on the InitialContext obtained from using the InitialContext constructor (i.e. the Java programming statement "new InitialContext( );"). When the application has been developed, a plan for deploying the application 610 is established. In this plan, it is determined if the environment in which it will be deployed supports FactoryFinder operations and the use of Application Contexts 612. If it does, it is next determined if one of the system's default Application Contexts will be sufficient 615 for the deployment of this application. If not, the next thing to be determined is if there already exists a Factory-Finder which would be appropriate to use 620 with an Application Context for this application. If not, a Factory-Finder with the desired characteristics must be created 625. In either case 620, there is now a FactoryFinder to use. A tool is then used 630 that creates an Application Context in the Name Space that is configured to use the FactoryFinder. Another tool is used 635 to generate an InitialContextFactory that will be able to position the JNDI InitialContext at the Application Context just created in step 630. If there already existed an appropriate default Application Context 615, then an appropriate InitialContextFactory is selected 640 that will position the JNDI InitialContext at that default Application Context. In the case where the environment did not support Application Contexts 612, whatever means are appropriate to that environment are used to select an InitialContextFactory 665 that will position the JNDI Initial-Context at a location where the EJBHomes are bound in that environment. All possible paths have now resulted in the determination of an InitialContextFactory to be used, so the InitialContextFactory is defined to the EJB application 645 by setting it into the system property defined for this use by the JNDI specification. The application can now be deployed 650 in the environment and the application can be run 655. While the application runs, the application uses the Application Context to lookup EJBHomes 660 using fully qualified EJBHome names. After this is accomplished, the methodology is completed 670, and the application is using fully qualified EJBHome names for finding EJBHomes.

To deploy this EJB application in another environment, this same methodology would be used starting at 610, making the plan for deployment in that environment. In all cases, there are no required changes to the source code developed for the EJB application 605 in order to deploy in another environment.

To illustrate the functionality of the present invention, four exemplary scenarios are presented. The four scenarios illustrate: the use of a simple name and a default Application Context; the use of a compound name and a default Application Context; the use of a simple name and an application specific Application Context; and the use of a compound name and an application specific Application Context.

Each of these scenarios demonstrates different aspects of the invention, with the last scenario utilizing all aspects of the invention.

In the examples it should be noted that the specification of the InitialContextFactory to be use is placed directly into the Java code. This has been done for ease of illustration. In an implementation of an EJB application where source code changes were to be eliminated for deployment in different environments, the system property defined by JNDI for containing the InitialContextFactory would be used, thus allowing the specification of the InitialContextFactory to be accomplished outside of the source code.

In the first example, a simple name with a default Application Context is illustrated. This is the simplest case. One of the default Application Contexts is used with a simple name for an EJBHome. The code would appear as follows:

1. // Get the name/port of the bootstrap host (local host will be bootstrap in this case)
2. properties.put(javax.naming.Context.PROVIDER_URL,
3. "IIOP:///");
4. // Get the name of the CB specific "host default initial context factory"
5. properties.put(javax.naming.Context.INITIAL_CONTEXT_FACTORY,
6. "com.ibm.ejb.cb.runtime.CBCtxFactoryHostScope");
7. // Get the initial context
8. initialContext=new InitialContext(properties);
9. // Get the LifePolicy home
10. homeAsObject=initialContext.lookup ("LifePolicyHome");
11. lifePolicyHome=(LifePolicyHome) javax.rmi.PortableRemoteObject.narrow(
12. (org.omg.CORBA.Object) homeAsObject,
13. LifePolicyHome.class);

On line 6, the initial context factory being used is "CBCtxFactoryHostScope". This will result in an initial context that can be found in the system name space at "host/resources/initial-contexts/host-scope". This Application Context will be configured to reference the FactoryFinder found at host/resources/factory-finders/host-scope. On line #10 of the example, there is a JNDI lookup call for "LifePolicyHome". When this lookup is performed, it will not be able to find LifePolicyHome directly bound into the default Application Context. The context will then call the FactoryFinder with which it is configured, passing it the string "LifePolicyHome.collection".

The Application Context will then return the LifePolicyHome which it gets from the FactoryFinder.

It should be noted in this scenario that no specific setup had to be done. The InitialContextFactory will be provided as a standard part of the environment, which in the preferred embodiment of this invention is the WebSphere Enterprise Edition Component Broker (CB). The existence of the default Application Context will be provided during the startup of the CB Name Server, including it being configured to use the host-scope FactoryFinder. The registration of the LifePolicyHome with the Life Cycle Service happens as a standard part of the "bring-up" of the server which contains the home. So this scenario is achieved without manual intervention and with no special tooling requirements.

There will be default Application Contexts and implementations of InitialContextFactory for all of the default FactoryFinder objects provided by CB which are scoped to the host, workgroup or cell. There will also be a default Application Context for all of the default FactoryFinder objects provided for servers and server groups. For example, the default FactoryFinder at:

"workgroup/resources/factory-finders/workgroup-scope"

will have a corresponding Application Context at

"workgroup/resources/initial-contexts/workgroup-scope"

and will have an InitialContextFactory named

"CBCtxFactoryWorkgroupScope".

The second scenario involves a compound name and a default Application Context. The case of the compound name with the default Application Context is almost identical to the simple name case above. The only difference is in how the parameter to the FactoryFinder is built. For example, if the JNDI lookup call in line #10 of the exemplary code was the compound name "com/prudential/insurance/LifePolicyHome"

the compound name would be converted by the Application Context to

"com::prudential::insurance::LifePolicyHome"

for example, and then be passed to the FactoryFinder as

"com::prudential::insurance::LifePolicyHome.collection".

As with the simple name, this does not require any special tooling to be introduced. However, it does require that the ".collection" name with which the Life Cycle Service registers the home in the Life Cycle repository be "com::prudential::insurance::LifePolicyHome".

In a third scenario, use of an application specific Application Context introduces two new tools that are needed to setup and use the application specific Application Context. The first tool creates the application specific Application Context in the name space and initializes it with an appropriate FactoryFinder to use. The FactoryFinder can be one of the default FactoryFinder objects provided by the Life Cycle Service, or it can be an application or administrative domain specific FactoryFinder such as a departmental specific FactoryFinder, which might be named, for example, "cell/resources/factory-finders/Dept21F". The second tool is used to generate the InitialContextFactory class that will be used by the application to get a reference to the Application Context as its initial context. This case is similar to scenario 1 above. The change to the code example would be in line #6, with the InitialContextFactory being specified as:

"com.prudential.insurance.LifeInsuranceAppCtxFactory"

rather than

"com.ibm.ejb.cb.runtime.CBCtxFactoryHostScope".

The FactoryFinder processing would be the same, with the only difference being the scope over which the FactoryFinder looked for homes (this is dependent upon which FactoryFinder is configured with the Application Context).

A fourth scenario involves a compound name and application specific Application Context. In its most straight forward form, this is a combination of scenarios 2 and 3 above. The generated InitialContextFactory would be used and the compound name would have its slashes ("/") changed to double colons {"::") by the Application Context. However, there is another level of support that is provided for this scenario which ensures the application side behavior is totally consistent with compound paths as they could be used in a JNDI lookup call. For example, suppose the application partially resolved the compound path to get to an intermediate context and then found the home using the remainder of the compound path. The exemplary code would be:

1. // Get the name/port of the bootstrap host (local host will be bootstrap in this case)
2. properties.put(javax.naming.Context.PROVIDER_URL,
3. "IIOP:///");
4. // Get the name of the application specific "Life Insurance Application initial contextfactory"
5. properties.put(javax.naming.Context.INITIAL_CONTEXT_FACTORY,
6. "com.prudential.insurance.LifeInsuranceAppCtxFactory");
7. // Get the initial context
8. initialContext=new InitialContext(properties);
9. // Get the context that contains the homes
10. homesContext=(Context) initialContext.lookup ("com/prudential/insurance");
11. // Get the LifePolicy home
12. homeAsObject=homesContext.lookup ("LifePolicyHome");
13. lifePolicyHome=(LifePolicyHome) javax.rmi.PortableRemoteObject.narrow(
14. (org.omg.CORBA.Object) homeAsObject,
15. LifePolicyHome.class);

In the above case, the contexts "com" and "com/prudential" and "com/prudential/insurance" would all have to actually exist. Note that in scenario 2, these contexts did not exist. Also note that the lookup of the home uses the name "LifePolicyHome", but the home is only known by the Life Cycle Service FactoryFinder as:

"com::prudential::insurance::LifePolicyHome".

The first part of the implementation of this relates to the tool that creates the Application Context. In addition to the Application Context (referred to as the "Base Application Context") the tool can also create sub-contexts off of the Base Application Context. Each of these is also an Application Context and is configured to use the same FactoryFinder as the Base Application Context is configured to use.

The second part of the implementation is that these sub-contexts are configured to know the path from the Base Application Context to themselves. So, the Application Context at "com/prudential/insurance" knows that its path from the Base Application Context is "com/prudential/insurance". Putting these two together, the lookup call in line #12 does the following:

(1) combines its configured path from the Base Application Context with the name to be resolved, yielding "com/prudential/insurance/LifePolicyHome";

(2) converts the name to

"com::prudential::insurance::LifePolicyHome.collection"

for the FactoryFinder call; and
(3) calls the configured FactoryFinder to locate the EJB-Home.

Thus the FactoryFinder processing for "LifePolicyHome" on the Application Context "com/prudential/insurance" is identical to the FactoryFinder processing for "com/prudential/insurance/LifePolicyHome" on the Base Application Context.

In scenario 4, there is a tool that is used to setup the Base Application Context and its sub-contexts. These sub-contexts can also be created by applications using standard JNDI createSubcontext calls. This provides the capability for sub-contexts off of the default Application Contexts and also provides an alternative mechanism for creating them under application specific Base Application Contexts. Exemplary code is as follows:

1. // Get the name/port of the bootstrap host (local host will be bootstrap in this case)
2. properties.put(javax.naming.Context.PROVIDER_URL,
3. "IIOP:///");
4. // Get the name of the CB specific "host default initial contextfactory"
5. properties.put(javax.naming.Context.INITIAL_CONTEXT_FACTORY,
6. "com.ibm.ejb.cb.runtime.CBCtxFactoryHostScope");
7. // Get the initial naming context
8. initialContext=new InitialContext(properties);
9. // Create the subcontexts
10. comSubContext=initialContext.createSubcontext ("com");
11. prudentialSubContext= comSubContext.createSubcontext("prudential");

The comSubContext and prudentialSubContext Application Contexts will each be created with their FactoryFinder configured as "host/resources/factory-finders/host-scope" (same as the InitialContext which is a Base Application Context). The path from the Base Application Context will be appropriately configured to be "com" and "com/prudential", respectively.

In all of the above examples, the Base Application Context always serves as the InitialContext. This does not always need to be the case. Consider an example where a client application wants to have visibility of the entire system name space for some reason. In this case, they would use the InitialContextFactory: com.ibm.ejb.cb.runtime.CBCtxFactory.

This positions the InitialContext at the root of the name space. To do a lookup from the InitialContext, a client could use an approach that exposes Life Cycle or an approach that hides Life Cycle. For an approach that exposes Life Cycle as in the referenced applications, the lookup is as follows:

"host/resources/factory-finders/host-scope/LifePolicy.object interface".

For the approach that hides Life Cycle in accordance with the present invention, the lookup is as follows:

"host/resources/initial-contexts/host-scope/LifePolicyHome"

or:

"host/applications/initial-contexts/LifeInsurance/com/prudential/insurance/LifePolicyHome".

The concept of the Application Context can take on several different meanings. For the most part, the key item for consideration is the FactoryFinder with which the Application Context is configured. For example, a Base Application Context may be created/configured for:

(1) Specific enterprise beans—An individual EJB or group of related enterprise beans being installed in a server or servers within the distributed object-oriented environment. The creation of the Application Context and the FactoryFinder it is configured with, is related to the installation of the enterprise beans. The Factory-Finder would be scoped according to how the enterprise beans were configured in the distributed environment. Clients of these enterprise beans are expected to use the InitialContextFactory related to this Application Context; or (2) A client—A client or set of related clients of some related or unrelated enterprise beans. In this case, the client has some specific scope within which it wants to find EJBHomes, so an Application Context is setup specifically for use by these clients; or (3) An administrative domain—Client applications running within a specific administrative domain are required to find their EJBHomes within some scope of the administrative domain. Creation of the Application Context and the InitialContextFactory is an administrative task and clients are expected to use the InitialContextFactory for the administrative domain.

The method and apparatus of the present invention has been described in connection with a preferred embodiment as disclosed herein. The disclosed methodology may be implemented in many different ways in order to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented partially or totally in program code stored on one of many possible media carriers, or other memory device, from which it may be accessed and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for finding an EJBHome in a distributed network environment, said method comprising:

establishing a NamingContext interface to a NamingContext;

establishing a FactoryFinder interface to a FactoryFinder;

enhancing said NamingContext to provide an enhanced NamingContext by adding a reference to said FactoryFinder and enabling said Naming Context to know its relative position in a name space;

adding a capability to said enhanced NamingContext to enable said enhanced NamingContext to generate a simple name suitable for use by said FactoryFinder; and using said enhanced NamingContext to find said EJB home.

2. The method as set forth in claim 1 and further including using said enhanced NamingContext as an Application Context.

3. The method as set forth in claim 1 wherein said simple name comprises a transformation of a compound name.

4. The method as set forth in claim 3 wherein said compound name is a combination of a name derived from said relative position in said name space and a name passed on in a resolve operation.

5. The method as set forth in claim 4 wherein said enhanced NamingContext is further enhanced to call said FactoryFinder using said simple name when normal NamingContext resolve processing would result in an exception being thrown.

6. The method as set forth in claim 5 wherein said enhanced NamingContext is usable as an initial context of an application.

7. The method as set forth in claim 6 wherein said enhanced NamingContext is capable of building a simple name from a relative location in name space of said enhanced NamingContext combined with said EJBHome name.

8. The method as set forth in claim 7 wherein said enhanced NamingContext is used to call a FactoryFinder using said simple name.

9. The method as set forth in claim 6 and further including:

determining that an environment supports an application context of said application; and creating said application context in name space, said application context being configured with said FactoryFinder.

10. The method as set forth in claim 9 and further including creating a FactoryFinder object if an applicable FactoryFinder is not available.

11. The method as set forth in claim 9 and further including setting an initial context factory for said application context.

12. The method as set forth in claim 11 and further including generating said initial context factory.

13. The method as set forth in claim 11 and further including defining said initial context factory to said application.

14. The method as set forth in claim 13 and further including using said application context to lookup said EJBHome.

15. A storage medium including machine readable coded indicia, said storage medium being selectively coupled to a reading device, said reading device being selectively coupled to processing circuitry, said reading device being selectively operable to read said machine readable coded indicia and provide program signals representative thereof, said program signals being effective for finding an EJBHome in a distributed network environment, said program signals being selectively operable to accomplish the steps of:

establishing a NamingContext interface to a NamingContext;

establishing a FactoryFinder interface to a FactoryFinder;

enhancing said NamingContext to provide an enhanced NamingContext by adding a reference to said FactoryFinder and enabling said Naming Context to know its relative position in a name space;

adding a capability to said enhanced NamingContext to enable said enhanced NamingContext to generate a simple name suitable for use by said FactoryFinder; and receiving a request to find said EJBHome, said request being made using an EJBHome name and a naming interface of a naming service; and processing said request by a factory finder of a factory finder service to find said EJBHome using said enhanced NamingContext to find said EJB home.

16. A distributed network information processing system comprising:
- a server device;
- at least one terminal; and
- a network connection arranged to selectively couple said terminal and said server, said server being responsive to a receipt of a request from said terminal to find an EJBHome, said request being made using an EJBHome name and a naming interface of a naming service, said server being selectively operable for processing said request by a factory finder of a factory finder service to find said EJBHome by accomplishing the steps of:
  establishing a NamingContext interface to a NamingContext;
  establishing a FactoryFinder interface to a FactoryFinder;
  enhancing said NamingContext to provide an enhanced NamingContext by adding a reference to said FactoryFinder and enabling said Naming Context to know its relative position in a name space;
  adding a capability to said enhanced NamingContext to enable said enhanced NamingContext to generate a simple name suitable for use by said FactoryFinder; and
  using said enhanced NamingContext to find said EJB home.

* * * * *